(12) United States Patent
Andes et al.

(10) Patent No.: US 6,709,206 B1
(45) Date of Patent: Mar. 23, 2004

(54) PIPE BEVELLER TOOL

(75) Inventors: Frank F. Andes, New Oxford, PA (US); Edward J. Assalita, Abbottstown, PA (US); Dan P. Moul, Hanover, PA (US); John H. Schuler, II, Littlestown, PA (US)

(73) Assignee: Avenger Tool Co., LLC, Littlestown, PA (US)

( * ) Notice: Subject to any disclaimer, the term of this patent is extended or adjusted under 35 U.S.C. 154(b) by 0 days.

(21) Appl. No.: 10/167,148

(22) Filed: Jun. 11, 2002

Related U.S. Application Data

(60) Provisional application No. 60/282,683, filed on Jul. 10, 2001.

(51) Int. Cl.[7] ................................................. B23B 5/16
(52) U.S. Cl. ........................ 408/211; 408/188; 408/713
(58) Field of Search ............................ 408/211, 227, 408/229, 713, 188, 187; 82/113; 7/157

(56) References Cited

U.S. PATENT DOCUMENTS

| | | | |
|---|---|---|---|
| 2,868,085 A | 1/1959 | Klein | 90/12 |
| 3,167,982 A | 2/1965 | Sherwood | 82/4 |
| 3,564,685 A | 2/1971 | Bjalme et al. | 29/105 |
| 3,595,107 A | 7/1971 | Dackow | 82/4 C |
| 3,636,803 A | 1/1972 | Miller | 82/4 C |
| 3,817,649 A | 6/1974 | Medney | 408/211 |
| 4,114,484 A | 9/1978 | Feamster, III | 82/4 C |
| 4,586,408 A | 5/1986 | Goldner | 82/4 C |
| 4,958,542 A | 9/1990 | Skerrett | 82/113 |
| 5,810,522 A | 9/1998 | Parker | 408/103 |

FOREIGN PATENT DOCUMENTS

GB  2241450  * 9/1991 ................. 408/211

* cited by examiner

*Primary Examiner*—Daniel W. Howell
(74) *Attorney, Agent, or Firm*—Hooker & Habib, P.C.

(57) ABSTRACT

A rotational pipe beveling tool that includes a frustoconical surface and a two edged cutting blade.

15 Claims, 4 Drawing Sheets

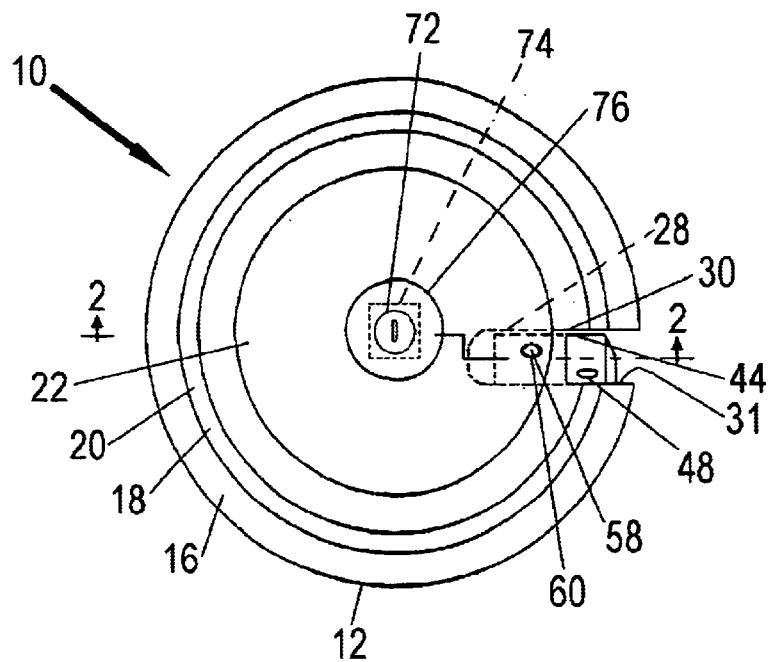
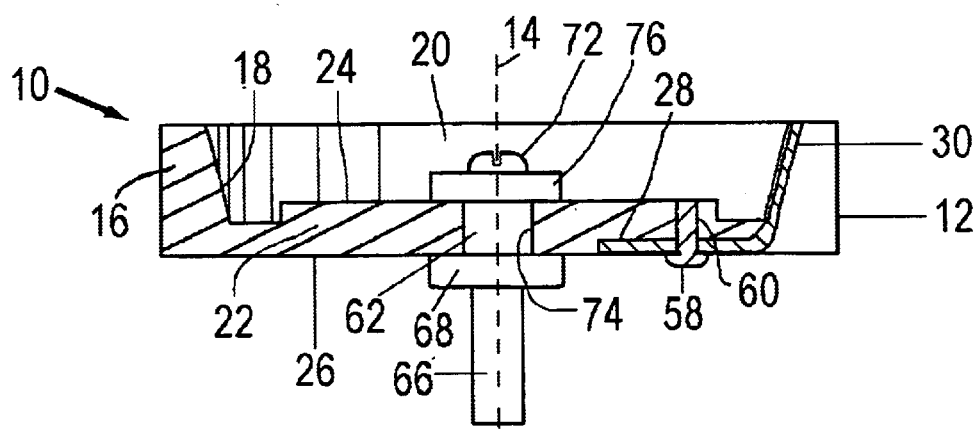

PIPE BEVELLER TOOL

This application claims the benefit of U.S. Provisional Application No. 60/282,683 filed Jul. 10, 2001.

FIELD OF THE INVENTION

The invention relates to tools used to bevel the outer surfaces of pipe ends.

BACKGROUND OF THE INVENTION

Reinforced fiberglass and plastic piping is commonly used for drainage and other applications. Joints are required between lengths of piping and coupling members. Inserting a pipe end into a close fitting coupling is difficult, particularly in the field. Pipe ends are commonly beveled to provide a tapered lead in which facilitates insertion into a coupling. Tools have been proposed to bevel pipe ends in the field.

These tools have a single cutting edge. A drawback is that with use, the cutting edge becomes dull and incapable of beveling pipe, requiring replacement of the blade. A replacement blade must be mounted in the tool. The time and effort taken for this replacement decreases worker efficiency.

Thus, there is a need for an improved pipe beveling tool with a two edged cutting blade that is easily repositioned in the tool to present a new sharp cutting edge when a first edge gets dull without having to replace the blade with a new blade.

SUMMARY OF THE INVENTION

The invention is a beveling tool which includes a two edged blade where the blade can be reversed to present each edge for beveling a pipe end. The blade is easily reversed in the field. If necessary, new blades can be fitted.

The cutting blade is positioned on the tool such that when one cutting edge is in position to bevel pipe, the other edge is located away from the pipe. As one cutting edge dulls through use, the other is preserved. Both cutting edges are on one cutter blade. Replacement of one cutting edge for another is accomplished though repositioning of the single cutter blade.

In the disclosed invention, the cutter blade is attached to a rotational body. The body can be attached to a drive shaft for mounting in an electric hand drill. Alternatively, the body can be rotated by a hand crank. The rotational body has a flange that defines a mouth into which a pipe end is placed. A frustoconical surface in the mouth guides the pipe ends during beveling.

The cutter blade is fastened to the rotational body by a mounting member, such as a screw fastener, extending through an opening in the cutter blade. The cutter blade can be adjusted relative to the frustoconical surface in order to change the depth of the bevel cut. As the rotational body is turned around the pipe, the blade cuts the end of the pipe, forming a beveled surface.

Other objects and features of the invention will become apparent as the description proceeds, especially when taken in conjunction with the accompanying drawings illustrating the invention, of which there are four sheets and two embodiments.

DESCRIPTION OF THE DRAWINGS

FIG. 1 is an end view of a first embodiment beveller tool;

FIG. 2 is a cross sectional view of FIG. 1, taken along line 2—2;

DESCRIPTION OF THE PREFERRED EMBODIMENTS

Figure 3:
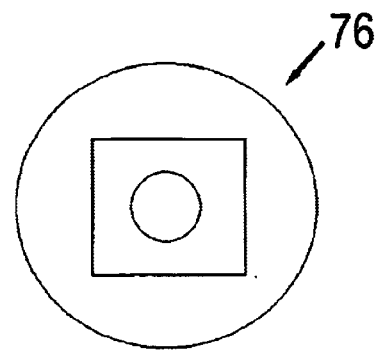
FIG. 3 is a top view of a washer of the invention.
Figure 4:
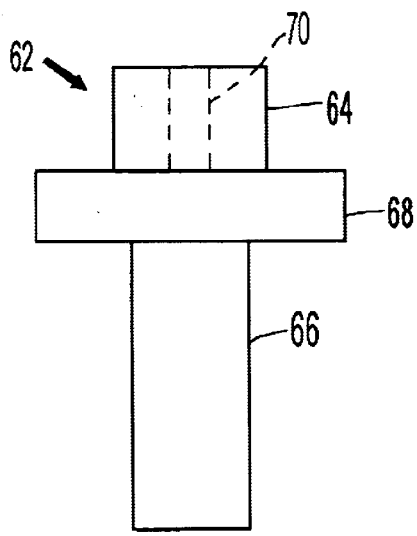
FIG. 4 is a side view of a drive attachment of the invention.

A first embodiment of pipe beveller tool 10 is shown in FIGS. 1–7. Tool 10 includes a rotational body 12 which has a rotational axis 14 and a circumference flange 16 having an inner frustoconical surface 18. The circumference flange 16 defines a body mouth 20 having a larger diameter than the outside diameter of a pipe that is to be beveled. The rotational body has a generally flat base 22 below the flange. Base 22 has topside 24 and a bottom side 26. The frustoconical surface 18 guides the pipe end during beveling.

Blade mounting slot 28 is formed in the bottom side 26 of base 22 and extends outwardly to the flange 16. The outer end of slot 28 communicates with a cutter slot 30 formed in flange 16. One side of slot 30 forms an abutment surface 31. Surface 31 holds an arm of one of the cutter blades during cutting.

Figure 5:
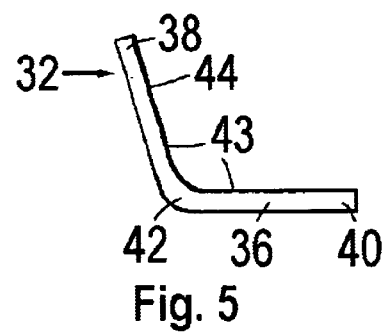
FIG. 5 is a side view of a dual blade for the invention.
Figure 6:
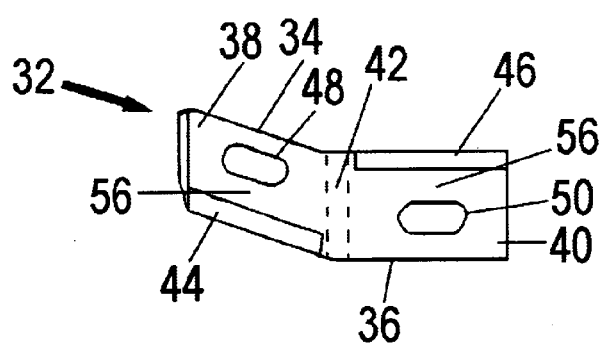
FIG. 6 is a perspective view of a dual blade.

Shown in detail in FIGS. 5 and 6, elongate cutter blade 32 has opposed sides 34 and 36 and includes two like flat arms 38 and 40 joined at bend 42. The arms intersect at the bend 42 and form an angle 43 of approximately 106 degrees. Arm 38 has a cutting edge 44 on side 36 and arm 40 has a cutting edge 46 on opposite side 34. Each arm has an elongate mounting opening 48, 50. In each arm, the mounting opening is located adjacent to the side of the cutter blade away from the cutting edge such that an edge support beam 56 is provided at each edge to support to the cutter blade 32 during beveling.

During beveling, arm 40 of the cutter blade is mounted in the bottom mounting slot 28 by a screw 58 extending through a mounting slot 50 and into a threaded hole 60 in the base 22 of body 12. In this position, cutting edge 44 parallels the frustoconical surface 18 and is on the radial axis of the body 12 and the side 34 opposite the edge engages the abutment surface 31.

The cutter blade 32 is rotationally symmetrical around the bend 42. When the blade 32 is rotated 180 degrees about the bend 42, it presents the same cutting profile as before rotation. This allows the cutter blade 32 to be mounted on the body 12 in one of two positions for beveling. When one cutting edge is dulled through use, the blade screw 58 can be removed and the cutter blade 32 is rotated 180 degrees and replaced into the cutter slot 30 with the other cutting edge in position to bevel pipe ends.

FIG. 3 shows drive attachment 62. Drive attachment 62 rotates the body 12. Attachment 62 has a square attachment head 64 at one end and a drive attachment shaft 66 at the other end. Drive attachment flange 68 is between the head 64 and the shaft 66. The drive attachment head 66 contains a threaded hole 70 for an attachment screw 72. Head 64 is fitted into square opening 74 in the base 22 and screw 72 holds a washer 76 against the base 22 so that the base 22 is sandwiched between the washer 76 and flange 68 and rotates with attachment 62.

In operation, the bevel tool 10 is rotated about the end of a pipe. The pipe is beveled by a cutting edge 44 or 46 on the cutter blade 32 as the rotational body 12 is rotated about the axis 14 by a power drill. Shaft 66 is maintained in the drill chuck. Alternatively, the attachment 62 may be removed from body 12 and the body 12 may be rotated by a hand tool such as a socket wrench. The square drive member of the socket wrench is inserted into square opening 74 for manual rotation.

Figure 7:
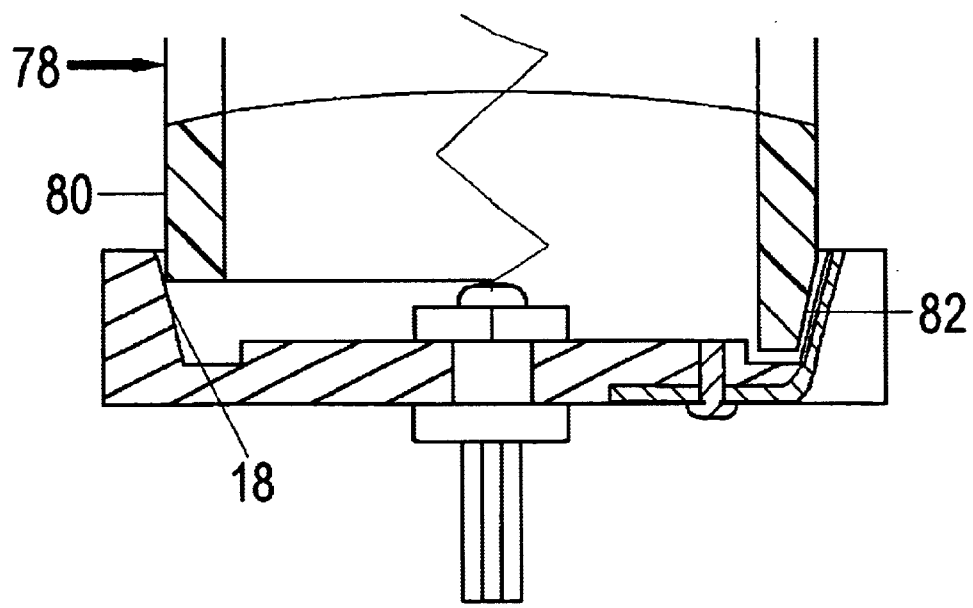
FIG. 7 shows the tool engaged in pipe cutting.

FIG. 7 shows a pipe 78 extended into bevel tool 10. When first inserted, the pipe 78 has an outer pipe surface 80 that is unbeveled. After cutting, the bevel tool 10 cuts a beveled outer pipe surface 82 that is parallel to the frustoconical surface 18.

Figure 8:
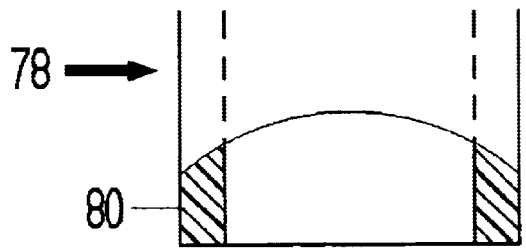
FIG. 8 shows a pipe before beveling.
Figure 9:
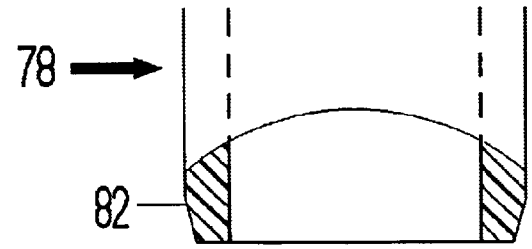
FIG. 9 shows a pipe after beveling.

FIG. 8 shows an end of pipe 78 before beveling. FIG. 9 shows an end of pipe 78 after beveling.

Figure 10:
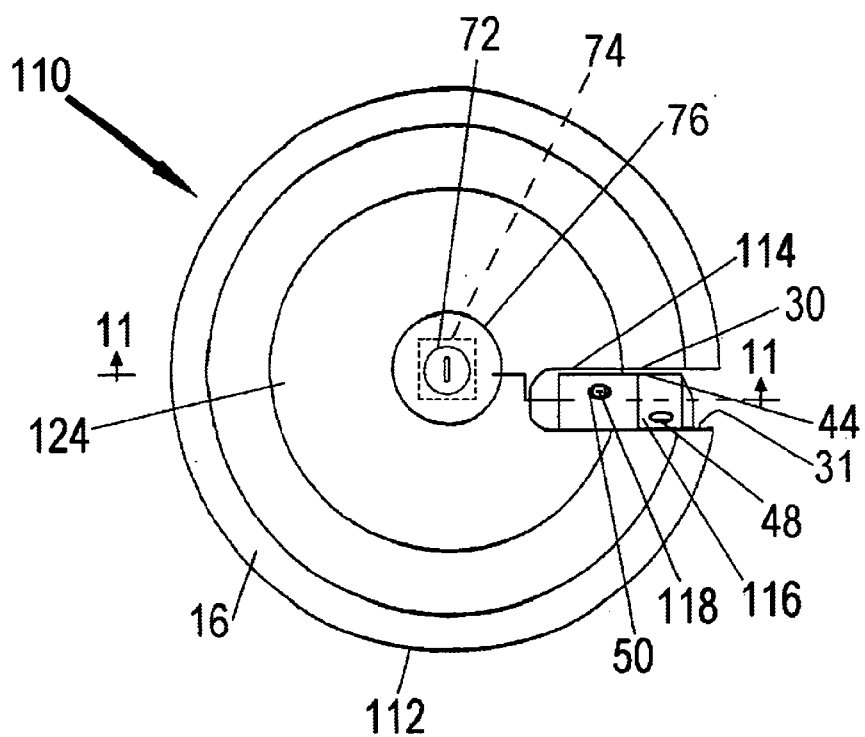
FIG. 10 is an end view of a second embodiment beveller tool.
Figure 11:
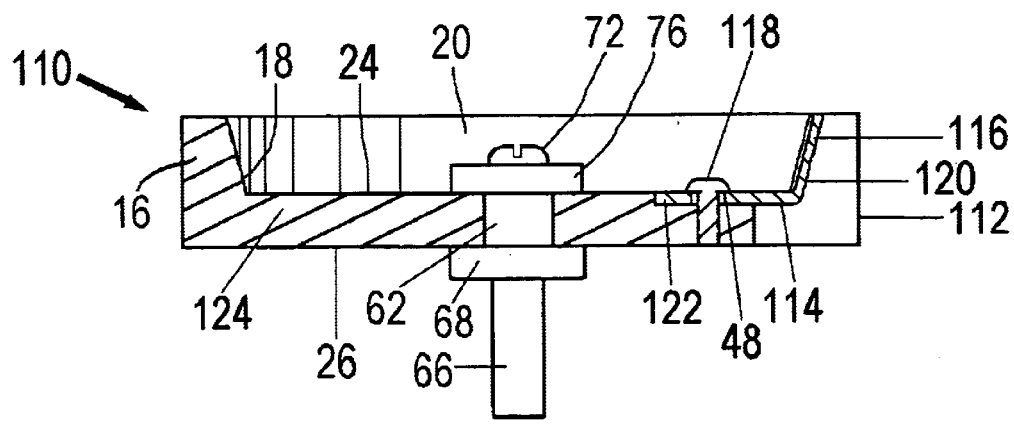
FIG. 11 is a cross sectional view of FIG. 10 taken along line 11—11.

FIGS. 10–11 illustrate a second embodiment pipe beveller tool 110. Tool 110 is similar to tool 10 so that several elements are similar to tool 10, except that rotational body 112 has a top blade slot. 114 in which a cutter blade 116 is mounted by a top screw 118. Cutter blade 116 is similar to cutter blade 34 except that the arms 120, 122, are foreshortened because there is no need for the blade to extend up through the thickness of base 124. Other elements of tool 110 are identical to tool 10 and are identified by the reference numbers used for the first embodiment.

The foregoing is considered as illustrative only of the principle of the invention. Since numerous modifications and changes will occur to those skilled in the art, it is not desired to limit the invention to the exact configuration shown and described above. Accordingly all suitable modifications and equivalents may be restored to within the scope of the invention as claimed.

While we have illustrated and described preferred embodiments of our invention, it is understood that this is capable of modification, and we therefore do not wish to be limited to the precise details set forth, but desire to avail ourselves of such changes and alterations as fall within the purview of the following claims.

What I claim as my invention:

1. A pipe beveling tool for cutting a bevel on the outer surface of an end of a pipe, the tool comprising:
    a rotational body having a rotational axis, the body including a circumference flange extending around the axis, the body including a base, the flange defining a body mouth of diameter greater than the diameter of the pipe to be beveled, the flange having a frustoconical surface;
    rotary drive means for rotating the body about the axis;
    an elongate cutter blade comprising a first arm, a second arm, a bend between the arms, opposed sides extending along the length of the arms and first and second cutting edges located on opposite sides of the cutter blade and longitudinally spaced along the cutter blade, said bend jointing the arms together, each cutting edge located on a blade arm; and
    means for mounting the cutter blade on the body in either a first position where a first cutting edge is located inwardly from the frustoconical surface to cut a bevel surface on an end of a pipe end extending into the mouth and the second cutting edge is located away from the frustoconical surface, or a second position where the second cutting edge is located inwardly from the frustoconical surface to cut a bevel surface on a pipe end extending into the mouth and the first cutting edge is located away from the frustoconical surface.

2. The pipe beveling tool of claim 1 wherein the means for mounting the cutter blade on the body includes means for adjustably locating an edge relative to the frustoconical surface.

3. A pipe beveling tool for cutting a bevel on the outer surface of an end of a pipe, the tool comprising:
    a rotational body having a rotational axis, the body including a base, a circumferential flange extending to one side of the base and around the axis, the base including a drive head receptacle through the axis, the body including a circumferential flange extending to one side of the base and around the axis, the flange having an internal wall defining a body mouth of diameter greater than the diameter of the pipe to be beveled, the internal wall having a frustoconical surface, the base having a cutter slot in the frustoconical surface, the base located between the frustoconical surface and the drive head receptacle, the frustoconical surface having a blade abutment, the base having a top side, the top side having a top blade slot contiguous with the cutter slot, the top blade slot having a threaded hole; and
    a cutter blade comprising:
        a first and second cutting edge wherein the cutter blade is elongate and includes opposed sides, the first and second cutting edges located on opposite sides of the cutter blade and longitudinally spaced apart along the cutter blade, the cutter blade having a first mounting opening located adjacent to the first cutting edge and a second mounting opening oriented adjacent to the second cutting edge, the mounting openings being elongate, the cutter blade comprised of a first arm and a second arm, said arms joined together at a bend, the arms forming an angle of about 106 degrees, the first mounting opening located adjacent to the side of the first arm away from the cutting edge and the first arm comprising a beam between the first cutting edge and the first mounting opening, the second mounting opening located adjacent to the side of the second arm away from the second cutting edge and the second arm comprising a beam between the second cutting edge and the second elongate opening.

4. The pipe beveling tool of claim 3 wherein the cutter blade is mounted into the top cutter slot with a blade screw fastened through a mounting opening and into the threaded hole so that a cutting edge is adjacent to the frustoconical surface and that a blade side facing away and opposite from the cutting edge engages the abutment surface so that the abutment surface supports the cutter blade during beveling and the cutter blade position is adjustable relative to the frustoconical surface.

5. The cutter blade of claim 1 wherein the arms form an angle of about 106 degrees.

6. The pipe beveling tool of claim 1 including a first mounting opening located adjacent to the first cutting edge and a second mounting opening located adjacent to the second cutting edge.

7. The pipe beveling tool of claim 6 wherein the mounting openings are elongate.

8. The pipe beveling tool of claim 6 wherein for each arm the mounting opening is adjacent to the side of the arm away from the cutting edge and the arm comprises a beam between the cutting edge and the opening.

9. The pipe beveling tool of claim 1 wherein the rotational body comprises:

a blade abutment on the frustoconical surface; and the cutter blade including a non-cutting edge facing away and opposite from the cutting edge, one such non-cutting edge overlying the abutment wherein the abutment supports the cutter blade during beveling.

10. The pipe beveling tool of claim 1 wherein the rotational body comprises a base with a top and a bottom, a top blade slot in the top side of the base, the cutter blade located in such slot.

11. The pipe beveling tool of claim 10 wherein the base comprises a bottom blade slot in the bottom side of the base, the cutter blade located in such slot.

12. The pipe beveling tool of claim 1 wherein the rotational body comprises a cutter slot in the frustoconical surface and a blade slot contiguous with the cutter slot, the cutter blade located in such slot.

13. The pipe beveling tool of claim 11 wherein the cutter slot is offset to one side of the rotational axis.

14. The pipe beveling tool of claim 11 wherein the means for mounting the cutter blade in the blade slot includes means for adjustably positioning an edge relative to the cutter slot.

15. The pipe beveling tool of claim 3 wherein a drive attachment is mounted to the body through the drive head receptacle, the drive attachment comprising:

a drive head, the drive head having a screw head receptacle, a drive flange adjacent to the drive head and away from the screw receptacle, a drive shaft adjacent to the drive flange and away from the drive head, a washer positioned adjacent to the drive head receptacle and on the base such that a screw is affixed through the washer and into the drive head.

\* \* \* \* \*